United States Patent Office 3,748,326
Patented July 24, 1973

---

3,748,326
5-HYDROXY-1-[(5-NITROFURFURYLIDENE)-AMINO]HYDANTOIN
Thomas J. Schwan and Ralph L. White, Jr., Norwich, N.Y., assignors to Morton-Norwich Products, Inc.
No Drawing. Filed Jan. 17, 1972, Ser. No. 218,554
Int. Cl. C07d 49/32
U.S. Cl. 260—240 A                         2 Claims

ABSTRACT OF THE DISCLOSURE 5-hydroxy - 1 - [(5-nitrofurfurylidene)amino]hydantoin is a useful antibacterial agent.

---

This invention relates to a nitrofuran compound 5-hydroxy-1-[(5-nitrofurfurylidene)amino]hydantoin. In common with other nitrofuran compounds it possesses a wide antibacterial spectrum in commonly employed in vitro methods for assaying such effect. Its spectrum encompasses organisms such as *Staphylococcus aureus*, *Escherichia coli*, *Salmonella typhosa*, *Shigella flexneri* and *Hemophilas vaginalis* at concentrations of from 3 to 50 mcg./ml. in test media.

The compound of this invention resists metabolic destruction in vivo upon peroral administration. When administered per os to dogs in a dose of about 10 mg./kg. as a suspension in sodium carboxymethyl cellulose, about 20% of that dose is recovered in the urine thus making it useful as a urinary tract antibacterial agent.

The method presently contemplated for preparing the compound consists in reacting nitrofurfural with 1-amino-5-hydroxyhydantoin. In carrying out this synthesis the preparation of the vital 1-amino-5-hydroxy-hydantoin intermediate is accomplished through the reaction of benzaldehyde semicarbazone with oxalyl chloride to form 1-(benzylideneamino)parabanic acid which upon catalytic reduction is converted to 1-amino-5-hydroxyhydantoin. This compound can be reacted with p-biphenylcarboxaldehyde in acidic media to form 1-(biphenylideneamino)-5-hydroxyhydantoin which under hydrolytic conditions is brought into contact with nitrofural to yield 5-hydroxy-1-[(5-nitrofurfurylidene)amino]hydantoin.

In order that this invention may be readily available to and understood by those skilled in the art the following synthesis is set forth:

In a 3.0 l. flask equipped with condenser, drying tube, stirrer, and dropping funnel was placed 114 g. (0.70 mole) of benzaldehyde semicarbazone in 1.0 l. of anhydrous diethyl ether. Oxalyl chloride (64 ml. 0.75 mole) was added dropwise during 30 minutes rapidly enough to maintain a gentle reflux, and the solution was stirred another 2.5 hours after completing the addition. The solid was collected by filtration and recrystallized from 3.5 l. of 2-propanol to yield 119 g. (74% yield) of 1-(benzylideneamino)parabanic acid, M.P. 205–207°.

1-(benzylideneamino)parabanic acid (174 g. 0.80 mole) was divided equally in two 2 liter reduction vessels containing methanol (500 ml.). Palladium/charcoal (5% with 50% water, 40 g.) was divided equally into each vessel and the mixtures were reduced on a Parr apparatus until about 95% of the theoretical three equivalents of hydrogen was taken up (24 hrs.). The combined reduced mixtures were filtered and the insoluble residue was rinsed with 600 ml. of methanol. The methanol rinse solution was combined with the filtrate. The methanolic solution was made slightly acidic with concentrated hydrochloric acid and then p-biphenylcarboxaldehyde (0.40 mole, 73 g.) was added. The mixture was stirred for two hours and the resulting solid was collected (21 g., 28% based on added aldehyde).

In tetrahydrofuran (500 ml.) were placed 1-(biphenylylideneamino)-5-hydroxydantoin (20 g., 0.07 mole), nitrofurfuryl diacetate (11 g., 0.08 mole) and concentrated hydrochloric acid (5 ml.). The solution was refluxed 1.0 hour and then concentrated under reduced pressure to a dry yellow solid. Benzene (100 ml.) was added and the mixture was again concentrated to a dry solid. The solid was stirred for 30 minutes with 400 ml. of anhydrous ether and the mixture was filtered to yield 5-hydroxy-1-[(5-nitrofurfurylidene)amino]hydantoin (15 g., 88%; 25% overall).

What is claimed is:
1. 5 - hydroxy - 1 - [(5-nitrofurfurylidene)amino]hydantoin.
2. The method of preparing 5-hydroxy-1-[(5-nitrofurfurylidene)amino]hydantoin which comprises reacting benzaldehyde semicarbazone with oxalyl chloride to form 1 - (benzylideneamino)parabanic acid; reduction of that acid with Pd/C to yield 1-amino-5-hydroxyhydantoin; reaction of that amino compound with p-biphenylcarboxaldehyde in acidic media to prepare 1 - (biphenylylideneamino)-5-hydroxyhydantoin; and exchange of that biphenylylidene moiety by nitrofurfurylidene in the presence of nitrofurfural and under the influence of acid.

References Cited
UNITED STATES PATENTS

| 2,610,181 | 9/1952 | Hayes | 260—240 A |
| 3,007,846 | 11/1961 | Gever et al. | 260—240 A |

FOREIGN PATENTS

| 951 | 11/1961 | France | 260—240 |

OTHER REFERENCES

Fisher et al., J. Am. Chem. Soc., vol. 77, pp. 4894–4896 (1955) (shows 5-hydroxyhydantoin).

JOHN D. RANDOLPH, Primary Examiner

U.S. Cl. X.R.
424—273; 260—240 G